United States Patent
Kim et al.

(10) Patent No.: US 8,675,445 B2
(45) Date of Patent: Mar. 18, 2014

(54) BEAMFORMER, DIAGNOSTIC SYSTEM, MEDICAL IMAGE SYSTEM, AND METHOD FOR DISPLAYING DIAGNOSTIC IMAGE

(75) Inventors: Kyu-hong Kim, Suwon-si (KR); Jung-ho Kim, Yongin-si (KR); Sung-chan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 13/242,217

(22) Filed: Sep. 23, 2011

(65) Prior Publication Data

US 2012/0275261 A1   Nov. 1, 2012

(30) Foreign Application Priority Data

Apr. 26, 2011   (KR) .................. 10-2011-0039081

(51) Int. Cl.
  *G01H 3/00*   (2006.01)
  *G01H 3/12*   (2006.01)

(52) U.S. Cl.
  CPC ..................... *G01H 3/125* (2013.01)
  USPC ............................................................ 367/7

(58) Field of Classification Search
  USPC ............................................................ 367/7
  See application file for complete search history.

(56) References Cited

U.S. PATENT DOCUMENTS

| | | | |
|---|---|---|---|
| 6,135,956 | A | 10/2000 | Schmiesing et al. |
| 6,210,328 | B1 | 4/2001 | Robinson et al. |
| 6,258,034 | B1 | 7/2001 | Hanafy |
| 6,733,453 | B2 | 5/2004 | Freiburger et al. |
| 6,790,181 | B2 | 9/2004 | Cai et al. |
| 2004/0161028 | A1* | 8/2004 | Roberts et al. ............... 375/227 |
| 2009/0141957 | A1 | | 6/2009 | Yen et al. |

FOREIGN PATENT DOCUMENTS

| | | |
|---|---|---|
| JP | 2006-051355 | 2/2006 |
| JP | 2006-149503 | 6/2006 |
| KR | 10-2009-0042185 A | 4/2009 |

OTHER PUBLICATIONS

Nilsen, et al. (Jun. 1, 2010). "Wiener Beamforming and the Coherence Factor in Ultrasound Imaging." *IEEE Transactions on Ultrasonics, Ferroelectrics and Frequency Control*. vol. 57, No. 6; pp. 1329-1346.

Seo, et al. (Oct. 1, 2008). "Sidelobe Suppression in Ultrasound Imaging Using Dual Apodization with Cross-Correlation." *IEEE Transactions on Ultrasonics, Ferroelectrics and Frequency Control*. vol. 55, No. 10; pp. 2198-2210.

Stankwitz, et al. (Jan. 1995). "Nonlinear Apodization for Sidelobe Control in SAR Imagery." *IEEE Transactions on Aerospace and Electronics Systems*. vol. 31, No. 1; pp. 267-279.

(Continued)

*Primary Examiner* — Isam Alsomiri
*Assistant Examiner* — James Hulka
(74) *Attorney, Agent, or Firm* — NSIP Law

(57) ABSTRACT

A beamformer for forming a reception beam using a multichannel signal reflected from a subject is provided. The beamformer includes a signal generator that may generate a plurality of signals to which different apodization functions are applied, with respect to the multichannel signal, an estimator that may estimate a signal predominant component and a noise predominant component from the plurality of signals, a weight calculator that may calculate a weight to be applied to the signal predominant component according to each of channels, using the estimated signal predominant component and the estimated noise predominant component, and a weight applier that may apply the calculated weight to the estimated signal predominant component.

20 Claims, 4 Drawing Sheets

(56) References Cited

OTHER PUBLICATIONS

European Search Report mailed Aug. 10, 2012, issued in counterpart European Patent Application No. 12 15 8336.3; 12 pages in English language.

Na et al., "A Study on Sidelobe Reduction Using Kaiser Window in Ultrasonic Imaging System", *J. of Kosombe*, vol. 17, No. 2., 1996. (11 pages).

* cited by examiner

BEAMFORMER, DIAGNOSTIC SYSTEM, MEDICAL IMAGE SYSTEM, AND METHOD FOR DISPLAYING DIAGNOSTIC IMAGE

CROSS-REFERENCE TO RELATED APPLICATIONS

This application claims the benefit under 35 U.S.C. §119 (a) of Korean Patent Application No. 10-2011-0039081, filed on Apr. 26, 2011, in the Korean Intellectual Property Office, the entire disclosure of which is incorporated herein by reference for all purposes.

BACKGROUND

1. Field

The following description relates to a beamformer, a diagnostic system, a medical image system, and a method of displaying a diagnostic image.

2. Description of the Related Art

An image system using a synthetic aperture technique may use a fixed beamforming technique or an adaptive beamforming technique. The fixed beamforming technique may use a Hamming window or a Hanning window, and the fixed beamforming technique may also be referred to as a data-independent beamforming technique. A diagnostic image generated according to the fixed beamforming technique may not have suitable contrast or resolution. Accordingly, the adaptive beamforming technique may be used to obtain a better quality image with a better contrast or resolution than an image obtained by the fixed beamforming technique. A diagnostic image generated according to the adaptive beamforming technique may have a higher resolution, but the adaptive beamforming technique is difficult to implement because throughput is higher than the throughput of a diagnostic image generated according to the fixed beamforming technique.

SUMMARY

According to an aspect, a beamformer for forming a reception beam using a multichannel signal reflected from a subject is provided. The beamformer includes a signal generator configured to generate a plurality of signals to which different apodization functions are applied, with respect to the multichannel signal, an estimator configured to estimate a signal predominant component and a noise predominant component from the plurality of signals, a weight calculator configured to calculate a weight to be applied to the signal predominant component according to each of channels, based on the estimated signal predominant component and the estimated noise predominant component, and a weight applier configured to apply the calculated weight to the estimated signal predominant component.

The weight calculator may be further configured to estimate a signal-to-noise power ratio (SNR) based on the estimated signal predominant component and the estimated noise predominant component, and calculate the weight by using the estimated SNR.

The signal generator may include a first signal generator configured to generate a first signal using a first apodization function with respect to the multichannel signal, and a second signal generator configured to generate a second signal using a second apodization function with respect to the multichannel signal.

The estimator may include a signal predominant component estimator configured to estimate a signal predominant component by calculating a sum of the first and second signals, and a noise predominant component estimator configured to estimate a noise predominant component by calculating a difference between the first and second signals.

The estimator may be configured to estimate a sum of the plurality of signals or a signal having a smallest absolute value from among the plurality of signals, as the signal predominant component.

The weight applier may be a Wiener filter, and the weight calculator may be further configured to calculate a Wiener gain.

The multichannel signal reflected from the subject may be received by transducers arranged in an elevation direction, a lateral direction, or a combination thereof.

In another aspect, an apparatus for generating a diagnostic image using a multichannel signal reflected from a subject is provided. The apparatus includes a beamformer configured to estimate a signal predominant component and a noise predominant component from a plurality of signals to which different apodization functions are applied with respect to the multichannel signal, calculate a weight according to each of channels based on the estimated signal predominant component and the estimated noise predominant component, and form a reception beam by applying the calculated weight to the estimated signal predominant component, a compounder configured to compound reception beams that are formed by the beamformer according to locations in which the reception beams are reflected from, and a diagnostic image generator configured to generate a diagnostic image based on the compounded reception beams.

The beamformer may be further configured to estimate a signal-to-noise power ratio (SNR) based on the estimated signal predominant component and the estimated noise predominant component, and calculate the weight based on the estimated SNR.

The beamformer may be configured to estimate the signal predominant component by calculating a sum of the plurality of signals to which different apodization functions are applied, and estimate the noise predominant component by calculating a difference between the plurality of signals.

The multichannel signal reflected from the subject may be received by transducers arranged in an elevation direction, a lateral direction, or a combination thereof.

In another aspect, a medical image system is provided. The medical image system includes a probe configured to receive a signal reflected from a subject using a plurality of transducers, and an apparatus configured to generate a diagnostic image, which estimates a signal predominant component and a noise predominant component from a plurality of signals to which different apodization functions are applied with respect to a multichannel signal received from the probe, calculate a weight according to each of channels based on the estimated signal predominant component and the estimated noise predominant component, form reception beams by applying the calculated weight to the estimated signal predominant component, and generate a diagnostic image by compounding the reception beams.

The plurality of transducers included in the probe may be arranged in an elevation direction and a lateral direction, and the multichannel signal received by the probe may be received by transducers arranged in the elevation direction, the lateral direction, or a combination thereof.

In another aspect, a method of displaying a diagnostic image using a multichannel signal reflected from a subject is provided. The method includes generating a plurality of signals to which different apodization functions are applied with respect to the multichannel signal, estimating a signal predominant component and a noise predominant component from the generated plurality of signals, calculating a weight to be applied to the signal predominant component according to each of channels, based on the estimated signal predominant component and the estimated noise predominant component, and forming reception beams by applying the calculated weight to the estimated signal predominant component.

The calculating of the weight may include estimating a signal-to-noise power ratio (SNR) based on the estimated signal predominant component and the estimated noise predominant component, and calculating the weight based on the estimated SNR.

The generating of the plurality of signals may include generating a first signal using a first apodization function with respect to the multichannel signal, and generating a second signal using a second apodization function with respect to the multichannel signal.

The estimating may include estimating the signal predominant component by calculating a sum of the first and second signals, and estimating the noise predominant component by calculating a difference between the first and second signals.

The multichannel signal reflected from the subject may be received by transducers arranged in an elevation direction, a lateral direction, or a combination thereof.

The method may further include compounding the formed reception beams according to locations in which the reception beams are reflected from, generating a diagnostic image from the compounded reception beams, and displaying the generated diagnostic image.

In another aspect, there is provided a computer-readable storage medium having stored therein program instructions to cause a processor to implement a method of displaying a diagnostic image using a multichannel signal reflected from a subject, the method including generating a plurality of signals to which different apodization functions are applied with respect to the multichannel signal, estimating a signal predominant component and a noise predominant component from the generated plurality of signals, calculating a weight to be applied to the signal predominant component according to each of channels, based on the estimated signal predominant component and the estimated noise predominant component, and forming reception beams by applying the calculated weight to the estimated signal predominant component.

Other features and aspects may be apparent from the following detailed description, the drawings, and the claims.

Figure 1:
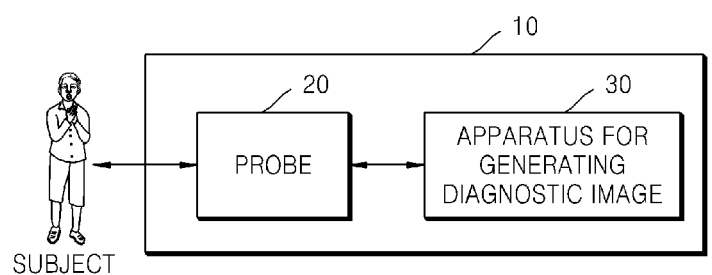
FIG. 1 is a diagram illustrating an example of an environment using a diagnostic system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of an environment of using a diagnostic system 10. Referring to FIG. 1, the diagnostic system 10 includes a probe 20 and an apparatus 30 for generating a diagnostic image. In some examples, the diagnostic system 10 is not limited to the described probe 20 and the apparatus 30.

The probe 20 and the apparatus 30 are shown as separate devices in the example of FIG. 1. As another example, the apparatus 30 and the probe 20 may be combined with each other.

The probe 20 may transmit and receive a signal of a subject using at least one transducer, and the apparatus 30 may generate a diagnostic image using the signal received from the probe 20. In various examples, the apparatus 30 may include a beamformer, a compounder, an image generator, and the like. For example, the apparatus 30 may generate a diagnostic image using a beamformer for forming reception beams by applying a time delay value and a weight to the signal received from the probe 20. A compounder may be used to compound the formed reception beams according to locations where the reception beams are reflected from. A diagnostic image generator may be used to generate a diagnostic image by extracting a brightness of the image or motion information.

Figure 2:
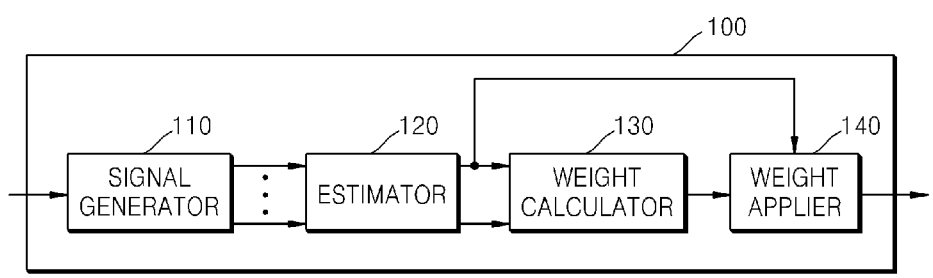
FIG. 2 is a diagram illustrating an example of a beamformer.

FIG. 2 illustrates an example of a beamformer 100. Referring to FIG. 2, the beamformer 100 includes a signal generator 110, an estimator 120, a weight calculator 130, and a weight applier 140.

Elements related to the present example are shown in the beamformer 100 of FIG. 2. However, it should be appreciated that other elements may be included in the beamformer 100. For example, the beamformer 100 of FIG. 2 shows elements for forming reception beams by applying a weight to a multichannel signal reflected from a subject. In various examples, the beamformer 100 may further include an element for forming a transmission beam and elements for applying a time delay value to the multichannel signal reflected from the subject.

The signal generator 110, the estimator 120, the weight calculator 130, and/or the weight applier 140 of the beamformer 100 of FIG. 2 may be implemented by one or more processors. For example, the processor may be implemented in an array of a plurality of logic gates, or in a combination of a general-purpose microprocessor and a memory storing a program executable in the general-purpose microprocessor.

The beamformer 100 may form the reception beams using the multichannel signal that is reflected from the subject. For example, the multichannel signal reflected from the subject may be a radio frequency (RF) signal. The radio frequency (RF) signal may be reflected from the subject and received by one or more transducers (not shown). Also, the forming of the reception beams may refer to estimating intensity or strength of a signal reflected at one point in a space.

The signal generator 110 may generate a plurality of signals to which different apodization functions are applied with respect to the multichannel signal reflected from the subject. As a non-limiting example, the multichannel signal input to the signal generator 110 may be a signal, and the signal may have the same phase considering a time delay value according to each of channels after a signal reflected from the subject is converted into an electric signal.

Also, as a non-limiting example, an apodization function may be a window function for applying a weight according to each of channels to the multichannel signal reflected from the subject. For example, the apodization function may include a rectangular window form, a Hamming window form, or a Hanning window form.

For example, in response to the apodization function having a rectangular window form, a width of a mainlobe may be small and a level of a sidelobe may be high in terms of a point spread function (PSF). Accordingly, in this example, the resolution may be high but the contrast may be low.

As another example, in response to the apodization function having a Hamming window form, a width of a mainlobe may be relatively wide and a level of a sidelobe may be low in terms of a PSF. In this example, the resolution may be low but the contrast may be high.

As such, the form of the apodization function may result in either a low resolution or a low contrast. The beamformer 100 may form the reception beams for generating a diagnostic image that has good resolution and good contrast using the signals in which different apodization functions are applied.

Also, in response to the apodization functions having various window forms, window sizes may be the same. Accordingly, resolution of a diagnostic image generated using the reception beams formed by the beamformer 100 may be guaranteed.

The signal generator 110 may generate two signals, for example, the signal generator 110 may generate a first signal by applying any one window function according to a first apodization function to the multichannel signal, and generate a second signal by applying any one window function according to a second apodization function to the multichannel signal. In this example, the first apodization function may be different window function from the second apodization function.

The estimator 120 may estimate a signal predominant component and a noise predominant component based on the signals generated by the signal generator 110. In this example, the signal predominant component refers to a component that is obtained by extracting a signal component from the signals, and the noise predominant component refers to a component that is obtained by extracting a noise component from the signals.

As another example, in the signals to which different apodization functions are applied with respect to the multichannel signal, a portion of the signals may have similar values due to characteristics of the subject, and a portion of the signals may have different values due to a change of the sidelobe. In this example, the change of the sidelobe may be caused by a change of an applied window.

The estimator 120 may estimate the signal predominant component and the noise predominant component by enhancing a similar portion and reducing a dissimilar portion from the signals to which different apodization functions are applied.

For example, the signal predominant component may correspond to a sum of the signals that are generated by the signal generator 110, and the noise predominant component may correspond to a difference between the signals that are generated by the signal generator 110. As another example, the signal predominant component may correspond to a signal having a smallest absolute value from among the signals generated by the signal generator 110.

The weight calculator 130 may calculate a weight to be applied to the signal predominant component according to each of channels, using the signal predominant component and the noise predominant component that are estimated by the estimator 120. Here, the weight calculated by the weight calculator 130 may correspond to the apodization function used to perform beamforming.

The weight to be applied according to each of channels may reduce a portion in which a signal component is more predominant than a noise component less, in comparison to a portion in which a noise component is more predominant than a signal component.

For example, the weight calculator 130 may estimate a signal-to-noise power ratio (SNR) using the signal predominant component and the noise predominant component, and the weight calculator 130 may also calculate the weight using the estimated SNR.

Accordingly, the beamformer 100 may form the reception beams for generating a diagnostic image, and the diagnostic image may have an improved contrast by reducing an effect of the sidelobe.

The weight applier 140 may apply the weight calculated by the weight calculator 130 to the signal predominant component estimated by the estimator 120. A signal to which the weight is applied by the weight applier 140 may be a reception beam for generating a diagnostic image, and the diagnostic image may have an improved contrast.

Here, as a non-limiting example, the applying of the weight to the signal predominant component may refer to multiplying the weight and the signal predominant component.

The weight applier 140 may be a filter. As a non-limiting example, the weight applier 140 may be a Wiener filter. Accordingly, in response to the weight applier 140 being a Wiener filter, the weight calculator 130 may estimate a Wiener gain. In other words, the weight calculated by the weight calculator 130 may be a Wiener gain or a Wiener coefficient of the Wiener filter.

Accordingly, as the sidelobe is reduced, the beamformer 100 may form the reception beams for generating a diagnostic image having improved contrast.

Also, in response to the transducers included in a probe (not shown) being arranged in a two-dimensional (2D) array, the multichannel signal reflected from the subject may be received by transducers arranged in an elevation direction, a lateral direction, or a combination thereof.

For example, the beamformer 100 may generate the signals to which different apodization functions are applied using the multichannel signal received by the transducers arranged in the elevation direction, the lateral direction, or a combination thereof. The beamformer 100 may estimate the signal predominant component and the noise predominant component from the signals, calculate the weight according to each of channels by using the estimated signal predominant component and the estimated noise predominant component, and form the reception beams by applying the calculated weight to the signal predominant component. An example of this is described with reference to FIG. 5.

As described herein, in response to the transducers included in the probe being arranged in the 2D array, the beamformer 100 may perform beamforming by applying the weight calculated using the different apodization functions in the elevation direction, the lateral direction, or a combination thereof, and thus, the beamformer 100 is able to form the reception beams for generating a 3D diagnostic image having high resolution while reducing throughput.

Figure 3:
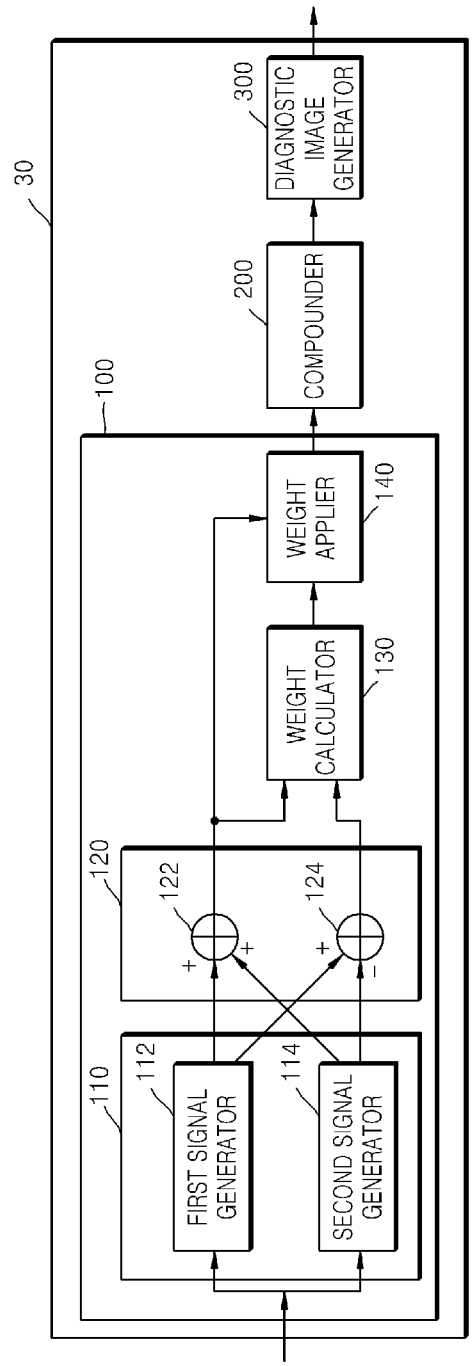
FIG. 3 is a diagram illustrating an example of an apparatus for generating a diagnostic image.

FIG. 3 illustrates an example of the apparatus 30 for generating a diagnostic image. Referring to FIG. 3, the apparatus 30 includes the beamformer 100, a compounder 200, and a diagnostic image generator 300. The beamformer 100 includes the signal generator 110, the estimator 120, the weight calculator 130, and the weight applier 140. The signal generator 110 includes a first signal generator 112 and a second signal generator 114. The estimator 120 includes a signal predominant component estimator 122 and a noise predominant component estimator 124.

As another example, it is understood by one of ordinary skill in the art that the signal generator 110 may further include a third signal generator (not shown) through nth signal generator (not shown).

The apparatus 30 of FIG. 3 includes elements related to the current example, and it is understood by one of ordinary skill in the art that other general-purpose elements may be included in the apparatus 30. Also, the beamformer 100, the compounder 200, and the diagnostic image generator 300 may be implemented by one or more processors.

The apparatus 30 of FIG. 3 corresponds to the apparatus 30 of FIG. 1 and the beamformer 100 of FIG. 2. Accordingly, the beamformer 100 is not limited to the elements shown in FIG. 3. Also, since described description with reference to FIGS. 1 and 2 may be applied to the apparatus 30 of FIG. 3, overlapping descriptions thereof will not be repeated for conciseness.

The apparatus 30 generates a diagnostic image by using a multichannel signal reflected from a subject. Here, the diagnostic image may correspond with an A-mode image showing amplitude information of the multichannel signal reflected from the subject, a B-mode image showing brightness information of the subject, or a D-mode image showing motion information of the subject. Since the A-mode image, the B-mode image, and the D-mode image are understood by one of ordinary skill in the art. A description thereof will not be provided herein for conciseness.

The beamformer 100 may estimate a signal predominant component and a noise predominant component from a plurality of signals to which different apodization functions are applied with respect to the multichannel signal reflected from the subject, calculate a weight according to each of channels by using the estimated signal predominant component and the noise predominant component, and form reception beams by applying the calculated weight to the estimated signal predominant component.

The signal generator 110 may generate the signals to which different apodization functions are applied with respect to the multichannel signal reflected from the subject. Here, in response to the signal generator 100 generating two signals, the first signal generator 112 may generate a first signal to which a first apodization function is applied, and the second signal generator 114 may generate a second signal to which a second apodization function is applied. The first apodization function may be different from the second apodization function.

The estimator 120 may estimate the signal predominant component and the noise predominant component from the signals generated by the signal generator 110. For example, the signal predominant component estimator 122 estimates the signal predominant component based on a calculation of a sum of the first and second signals, and the noise predominant component estimator 124 estimates the noise predominant component based on a calculation of a difference between the first and second signals.

As an example, the signal predominant component estimator 122 may estimate the signal predominant component using Equation 1.

$$r_{signal}(n)=s_1(n)+s_2(n) \quad \text{[Equation 1]}$$

In Equation 1, $r_{signal}(n)$ refers to the signal predominant component, $s_1(n)$ refers to the first signal, and $s_2(n)$ refers to the second signal.

Also, the noise predominant component estimator 124 may estimate the noise predominant component using Equation 2.

$$r_{noise}(n)=s_1(n)-s_2(n) \quad \text{[Equation 2]}$$

In Equation 2, $r_{noise}(n)$ refers to the noise predominant component, $s_1(n)$ refers to the first signal, and $s_2(n)$ refers to the second signal.

As another aspect, Equations 1 and 2 may be used in response to the signal generator 110 generating the first and second signals. Accordingly, in response to the signal generator 110 generating n signals, where n is an integer equal to or greater than 3, the signal predominant component estimator 122 may calculate a sum of the first through nth signals, and the noise predominant component estimator 124 may calculate a difference between the first through nth signals. In this example, it is understood by one of ordinary skill in the art that the noise predominant component estimator 124 may use any method to estimate the noise predominant component, for example, by calculating a difference between the first and second signals, a difference between the third and fourth signals, and a difference between the n−1th and nth signals, and adding the differences. As another example, the difference may be calculated by calculating a difference between the first and second signals, a difference between the second and third signals, a difference between the n−1th and nth signals, and adding the differences.

As another example, the signal predominant component estimator 122 may calculate absolute values of the signals generated by the signal generator 110, and estimate a signal having a smallest absolute value as the signal predominant component.

The weight calculator 130 may calculate the weight to be applied to the signal predominant component according to each of channels, using the signal predominant component and the noise predominant component estimated by the estimator 120. For example, the weight calculator 130 may estimate an SNR by using the signal predominant component and the noise predominant component, and calculate the weight by using the estimated SNR.

As another example, the weight calculator 130 may estimate the SNR by using Equation 3 below and calculate the weight using Equation 4.

$$SNR(n) = \left|\frac{r_{signal}(n)}{r_{noise}(n)}\right|^2 \quad \text{[Equation 3]}$$

$$w(n) = \frac{SNR(n)}{\alpha + \beta \cdot SNR(n)} \quad \text{[Equation 4]}$$

In Equations 3 and 4, SNR(n) refers to the SNR, $r_{signal}(n)$ refers to the signal predominant component, $r_{noise}(n)$ refers to the noise predominant component, w(n) refers to the weight, and $\alpha$ and $\beta$ refers to values determined via an experiment. Here, $\alpha$ may be relatively larger than $\beta$, for example, $\alpha$ may be 10 and $\beta$ may be 0.1. As another aspect, it is understood by one of ordinary skill in the art that other values may be used for $\alpha$ and $\beta$ based on an optimized experiment.

As such, the weight calculator 130 may calculate the weight to be applied according to each of channels, and the calculated weight may be a Wiener gain or a Wiener coefficient.

The weight applier 140 may apply the weight calculated by the weight calculator 130 to the signal predominant component estimated by the estimator 120. For example, the weight applier 140 may calculate a signal to which a weight is applied by multiplying the weight and the signal predominant component.

As another example, the weight applier 140 may calculate the signal to which the weight is applied by using Equation 5 below.

$$s(n) = r_{signal}(n) \cdot w(n) \quad \text{[Equation 5]}$$

In Equation 5, s(n) refers to the signal to which the weight is applied, $r_{signal}(n)$ refers to the signal predominant component, and w(n) refers to the weight.

As such, the weight applier 140 may calculate the signal to which the weight is applied, and in this example, the weight applier 140 may be a Wiener filter.

The signal to which the weight is applied may be the reception beam formed to generate a diagnostic image. Accordingly, the beamformer 100 may form the reception beams for generating a diagnostic image, and the diagnostic image may have an improved contrast by reducing an effect of sidelobe.

The compounder 200 may compound the reception beams formed by the beamformer 100 based on at least one location where the reception beams are reflected from. In this example, the compounder 200 compounds the reception beams reflected from the same point. The same point may refer to a point where signals transmitted from a plurality of transducers (not shown) to the subject are focused.

Here, since the reception beams formed by the beamformer 100 are formed by using different apodization functions with respect to the multichannel signal reflected from the subject, the reception beams reflected from the same location may be different from each other.

As the reception beams are compounded by the compounder 200, a signal corresponding to a signal component is enhanced and a signal corresponding to a noise component having at least one random characteristic is reduced.

Accordingly, the signals compounded by the compounder 200 overlap the reception beams formed at the same point, and contrast of a generated diagnostic image may be improved.

The diagnostic image generator 300 generates a diagnostic image from the signals compounded by the compounder 200. The diagnostic image generator 300 may generate a diagnostic image showing a B-mode image by extracting a brightness image from the compounded signals, or a diagnostic image showing a D-mode image by extracting motion information from the compounded signals. As another aspect, it is understood by one of ordinary skill in the art that the diagnostic image generator 300 may generate various images showing information about the subject, for example, an A-mode image.

In other words, the diagnostic image generator 300 may detect an envelop of the compounded signals and quantize the envelop in a log scale to extract brightness information. The diagnostic image generator 300 generates a diagnostic image showing a B-mode image. Accordingly, the diagnostic image generator 300 may include a digital signal processor (DSP) (not shown) and a digital scan converter (DSC) (not shown). The DSP forms image data for expressing an A, B, or D mode by processing the signals output from the compounder 200, and the DSC generates a diagnostic image that is scan-converted so as to display the image data formed by the DSP. Since the DSP and the DSC are understood by one of ordinary skill in the art, descriptions thereof will not be provided herein for conciseness.

Accordingly, the apparatus 30 may generate a high resolution diagnostic image by reducing a noise component by applying the weight calculated by using various apodization functions.

Figure 4:
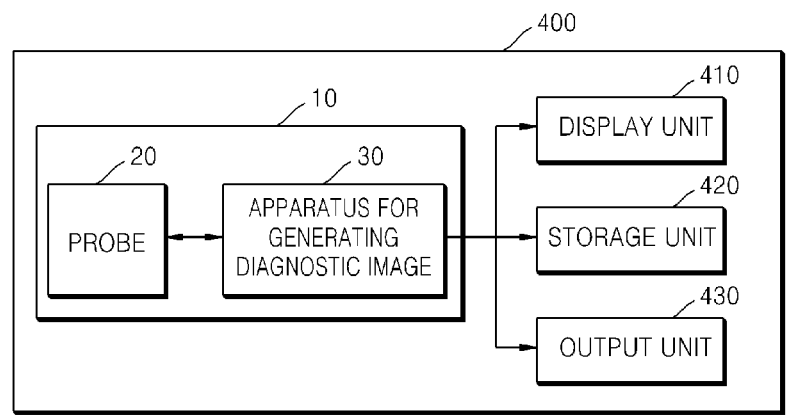
FIG. 4 is a diagram illustrating an example of a medical image system.

FIG. 4 is a diagram illustrating an example of a medical image system 400. The medical image system 400 includes a diagnostic system 10, a display unit 410, a storage unit 420, and an output unit 430, and the diagnostic system 10 includes a probe 20 and an apparatus 30 for generating a diagnostic image.

The medical image system 400 shown in FIG. 4 includes elements related to the current example. Accordingly, it is understood by one of ordinary skill in the art that the medical image system 400 may further include other general-purpose elements.

Also, the diagnostic system 10, the probe 20, and the apparatus 30 of FIG. 4 correspond to the diagnostic system 10, the probe 20, the apparatus 30, and the beamformer 100 shown in FIGS. 1 through 3. Accordingly, descriptions provided with reference to FIGS. 1 through 3 may be applied to the medical image system 400 of FIG. 4, and thus overlapping descriptions will not be repeated herein for conciseness.

The diagnostic system 10 generates a diagnostic image by using the probe 20 and the apparatus 30.

The probe 20 receives a signal reflected from a subject by using a plurality of transducers. For example, the signal reflected from the subject may be an ultrasonic wave signal, where the transducers convert the ultrasonic wave signal to an electric signal and output the electric signal to the apparatus 30.

In this example, each transducer receives the ultrasonic wave signal reflected from the subject, and each or a partial array of the transducers may indicate one channel. Thus, the probe 20 converts the ultrasonic wave signals received by using the transducers to electric signals according to each of reception channels, and outputs a multichannel signal obtained by converting the ultrasonic wave signals to the apparatus 30.

The apparatus 30 estimates a signal predominant component and a noise predominant component from a plurality of signals to which different apodization functions are applied with respect to the multichannel signal received from the probe 20, calculates a weight according to each of channels by using the estimated signal predominant component and the estimated noise predominant component, forms reception beams by applying the calculated weight to the estimated signal predominant component, and generates a diagnostic image by compounding the reception beams.

The display unit 410 displays the diagnostic image output from the apparatus 30. For example, the display unit 410 includes an output apparatus, such as a display panel, a touch screen, or a monitor prepared in the medical image system 400, and a software module for driving the output apparatus.

The storage unit 420 stores the diagnostic image output from the apparatus 30. For example, the storage unit 420 is a general storage medium, and it is understood by one of ordinary skill in the art that the storage unit 420 may be a hard disk drive (HDD), a read only memory (ROM), a random access memory (RAM), a flash memory, or a memory card.

The output unit 430 transmits the diagnostic image output from the apparatus 30 to an external apparatus, and receives data from the external apparatus. Here, the external apparatus may be another medical image system at a remote place, a general-purpose computer system, or a facsimile machine.

The output unit 430 may transmit and receive data to and from the external apparatus via a wired or a wireless network. As a non-limiting example, a network may be the Internet, a local area network (LAN), a wireless LAN, a wide area network (WAN), or a personal area network (PAN). As another aspect, the network may be any type of network as long as the network transmits and receives information.

Also, it is understood by one of ordinary skill in the art that an image reading and searching function may be further included in the storage unit 420 and the output unit 430 so as to integrate the storage unit 420 and the output unit 430 as a picture archiving communication system (PACS).

Accordingly, the medical image system 400 may display, storage, and transmit the diagnostic image generated and output by the diagnostic system 10.

Figure 5:
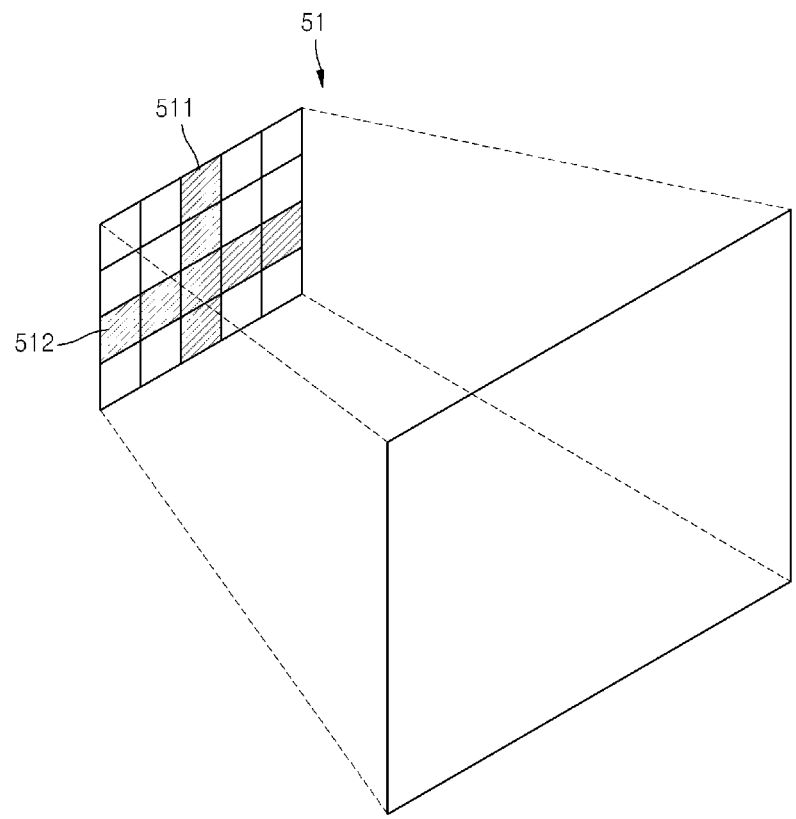
FIG. 5 is a diagram illustrating an example of a plurality of transducers included in a probe arranged in a two-dimensional (2D) array.

FIG. 5 is a diagram illustrating an example of a plurality of transducers 51 included in a probe 20 arranged in a 2D array.

Referring to FIGS. 3 through 5, the probe 20 includes the transducers 51 arranged in the 2D array. Here, the transducers 51 are arranged in an elevation direction 511 and a lateral direction 512.

In response to the transducers 51 being arranged in the 2D array, the beamformer 100 may generate a plurality of signals to which different apodization functions are applied by using a multichannel signal received from transducers arranged in the elevation direction 511, the lateral direction 512, or a combination thereof, estimate a signal predominant component and a noise predominant component from the signals, calculate a weight according to each of channels by using the estimated signal predominant component and the estimated noise predominant component, and form reception beams by applying the calculated weight to the estimated signal predominant component.

For example, the beamformer 100 may generate a plurality of signals to which different apodization functions are applied by using a multichannel signal received from transducers arranged in the elevation direction 511 and the lateral direction 512, estimate a signal predominant component and a noise predominant component from the signals, calculate a weight according to each of channels by using the estimated signal predominant component and the estimated noise predominant component, and form reception beams by applying the calculated weight to the estimated signal predominant component.

As another example, the beamformer 100 may generate a plurality of signals to which different apodization functions are applied by using a multichannel signal received from transducers arranged in the elevation direction 511, estimate a signal predominant component and a noise predominant component from the signals, calculate a weight according to channels by using the estimated signal predominant component and the estimated noise predominant component, and form reception beams by applying the calculated weight to the estimated signal predominant component.

Here, the beamformer 100 may form the reception beams by using a general fixed beamforming technique or a general adaptive beamforming technique by using the multichannel signal received from the transducers arranged in the lateral direction 512. As a non-limiting example, the fixed beamforming technique may be a delay and sum (DAS) beamforming and the adaptive beamforming technique may be minimum variance beamforming.

As another example, the beamformer 100 may generate a plurality of signals to which different apodization functions are applied by using a multichannel signal received from transducers arranged in the lateral direction 512, estimate a signal predominant component and a noise predominant component from the signals, calculate a weight according to each of channels by using the estimated signal predominant component and the estimated noise predominant component, and form reception beams by applying the calculated weight to the estimated signal predominant component.

Here, the beamformer 100 may form the reception beams by using a general fixed beamforming technique or a general adaptive beamforming technique by using the multichannel signal received from the transducers arranged in the elevation direction 511.

Accordingly, in response to the transducers 51 included in the probe 20 being arranged in the 2D array, the beamformer 100 performs beamforming by applying a weight calculated by using different apodization functions in the elevation direction 511, the lateral direction 512 or a combination thereof, and thus is able to form reception beams for generating a 3D diagnostic image of high resolution while reducing throughput.

Figure 6:
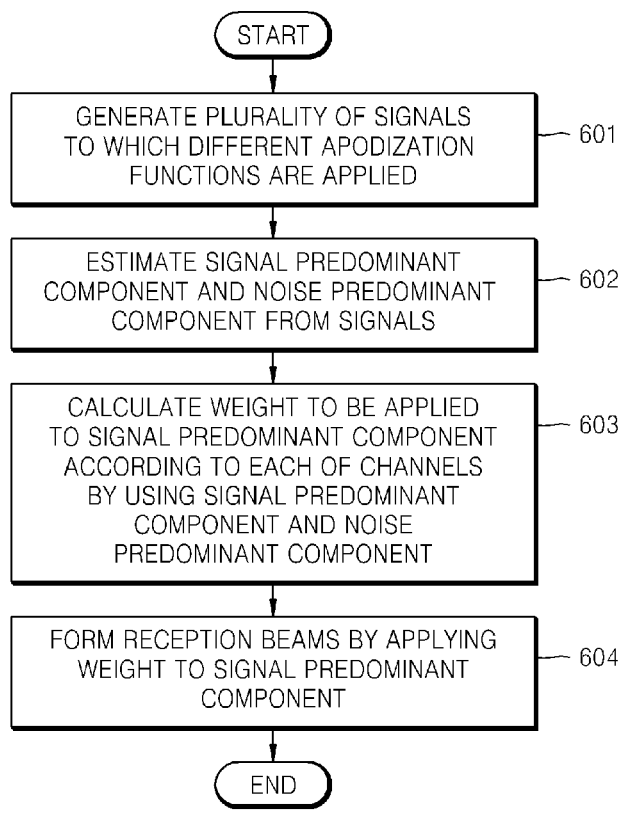
FIG. 6 is a flowchart illustrating an example of a method of displaying a diagnostic image.

FIG. 6 is a flowchart illustrating an example of a method of displaying a diagnostic image. Referring to FIG. 6, the method includes operations performed by the examples of the diagnostic system 10 of FIG. 1, the beamformer 100 of FIG. 2, the apparatus 30 of FIG. 3, or the medical image system 400 of FIG. 4. Accordingly, descriptions about the examples of the diagnostic system 10 of FIG. 1, the beamformer 100 of FIG. 2, the apparatus 30 of FIG. 3, and the medical image system 400 of FIG. 4 may also be applied to the method of FIG. 6 are within the scope of the teachings herein, and are omitted for conciseness.

In operation 601, the signal generator 110 generates a plurality of signals to which different apodization functions are applied with respect to a multichannel signal reflected from a subject. Here, the different apodization functions may include a rectangular window form, a Hamming window form, or a Hanning window form.

In operation 602, the estimator 120 estimates a signal predominant component and a noise predominant component from the signals generated in operation 601. Here, the estimator 120 may estimate the signal predominant component by adding the generated signals, and estimate the noise predominant component by using a difference between the signals.

In operation 603, the weight calculator 130 calculates a weight to be applied to the signal predominant component according to each of channels by using the signal predominant component and the noise predominant component estimated in operation 602. Here, the weight calculator 130 may estimate an SNR by using the signal predominant component and the noise predominant component, and calculate the weight by using the estimated SNR.

In operation 604, the weight applier 140 forms reception beams by applying the weight calculated in operation 603 to the signal predominant component estimated in operation 602. Here, the weight applier 140 may be a Wiener filter, and the weight calculated in operation 603 may be a gain or coefficient of the Wiener filter.

Also, the compounder 200 compounds the reception beams formed in operation 604 according to locations where the reception beams are reflected from, the diagnostic image generator 300 generates a diagnostic image from the compounded reception beams, and the display unit 410 displays the generated diagnostic image.

In response to a general spatial compounding technique being used, a size of an aperture is reduced, and thus resolution is deteriorated. As another example, in response to a general frequency compounding technique being used, complexity of a hardware system may increase due to a wide-band signal process.

Accordingly, in response to the beamforming and compounding technique of the present example being used, complexity of a hardware system is not increased and resolution is not deteriorated since a size of an aperture is maintained.

Also, the beamforming and compounding technique of the present example may improve resolution by reducing a noise component in a plurality of image signals, by using an overlapping principle of ultrasonic wave image signals at the same location obtained from various window apertures. In addition, by using the beamforming and compounding technique of the present example, contrast may be improved since a level of sidelobe is reduced compared to other general techniques.

As described above, according to the one or more of the above examples, reception beams for generating a highly vivid diagnostic image may be formed by reducing sidelobe. Also, the highly vivid diagnostic image may be generated and displayed by using the reception beams.

Examples of a medical device having the beamformer include an ultrasound.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A beamformer configured to form a reception beam, using a multichannel signal reflected from a subject, the beamformer comprising:
a signal generator configured to apply different apodization functions to the multichannel signal to generate respective signals;
an estimator configured to estimate a signal predominant component and a noise predominant component based on the signals;
a weight calculator configured to calculate a weight to be applied to the signal predominant component, using the signal predominant component and the noise predominant component; and
a weight applier configured to apply the weight to the signal predominant component.

2. The beamformer of claim 1, wherein the weight calculator is further configured to:
estimate a signal-to-noise power ratio (SNR), using the signal predominant component and the noise predominant component; and
calculate the weight based on the SNR.

3. The beamformer of claim 1, wherein the signal generator comprises:
a first signal generator configured to apply a first apodization function to the multichannel signal to generate a first signal; and
a second signal generator configured to apply a second apodization function to the multichannel signal to generate a second signal.

4. The beamformer of claim 3, wherein the estimator comprises:
a signal predominant component estimator configured to estimate the signal predominant component based on a sum of the first and second signals; and
a noise predominant component estimator configured to estimate the noise predominant component based on a difference between the first and second signals.

5. The beamformer of claim 1, wherein the estimator is further configured to estimate the signal predominant component as a sum of the signals, or a signal comprising a smallest absolute value, among the signals.

6. The beamformer of claim 1, wherein:
the weight applier is a Wiener filter; and
the weight calculator is further configured to calculate a Wiener gain.

7. The beamformer of claim 1, wherein the signal generator is further configured to:
receive the multichannel signal from transducers arranged in an elevation direction, or a lateral direction, or any combination thereof.

8. An apparatus configured to generate a diagnostic image, using a multichannel signal reflected from a subject, the apparatus comprising:
a beamformer configured to
apply different apodization functions to the multichannel signal to generate respective signals,
estimate a signal predominant component and a noise predominant component based on the signals,
calculate a weight, using the signal predominant component and the noise predominant component, and
apply the weight to the signal predominant component to form a reception beam;
a compounder configured to compound reception beams that are formed by the beamformer based on locations from which the reception beams are reflected; and a diagnostic image generator configured to generate the diagnostic image based on the compounded reception beams.

9. The apparatus of claim 8, wherein the beamformer is further configured to:
estimate a signal-to-noise power ratio (SNR), using the signal predominant component and the noise predominant component; and
calculate the weight based on the SNR.

10. The apparatus of claim 8, wherein the beamformer is further configured to:
estimate the signal predominant component based on a sum of the signals; and
estimate the noise predominant component based on a difference between the signals.

11. The apparatus of claim 8, wherein the beamformer is further configured to:
receive the multichannel signal from transducers arranged in an elevation direction, or a lateral direction, or any combination thereof.

12. A medical image system comprising:
a probe configured to receive a multichannel signal reflected from a subject, using transducers; and
an apparatus configured to
apply different apodization functions to the multichannel signal to generate respective signals,
estimate a signal predominant component and a noise predominant component based on the signals,
calculate a weight, using the signal predominant component and the noise predominant component,
apply the weight to the signal predominant component to form a reception beam,
compound reception beams that are formed by the apparatus, and
generate a diagnostic image based on the compounded reception beams.

13. The medical image system of claim 12, wherein the transducers are arranged in an elevation direction, or a lateral direction, or any combination thereof.

14. A method of displaying a diagnostic image, using a multichannel signal reflected from a subject, the method comprising:
applying different apodization functions to the multichannel signal to generate respective signals;
estimating a signal predominant component and a noise predominant component based on the signals;
calculating a weight to be applied to the signal predominant component, using the signal predominant component and the noise predominant component; and
applying the weight to the signal predominant component to form a reception beam.

15. The method of claim 14, wherein the calculating of the weight comprises:
estimating a signal-to-noise power ratio (SNR), using the signal predominant component and the noise predominant component; and
calculating the weight based on the SNR.

16. The method of claim 14, wherein the generating of the signals comprises:
applying a first apodization function to the multichannel signal to generate a first signal; and
applying a second apodization function to the multichannel signal to generate a second signal.

17. The method of claim 16, wherein the estimating comprises:
estimating the signal predominant component based on a sum of the first and second signals; and
estimating the noise predominant component based on a difference between the first and second signals.

18. The method of claim 14, further comprising:
receiving the multichannel signal from transducers arranged in an elevation direction, or a lateral direction, or any combination thereof.

19. The method of claim 14, further comprising:
compounding reception beams that are formed based on locations from which the reception beams are reflected;
generating a diagnostic image based on the compounded reception beams; and
displaying the diagnostic image.

20. A non-transitory computer-readable storage medium storing a program comprising instructions to cause a processor to implement a method of displaying a diagnostic image, using a multichannel signal reflected from a subject, the method comprising:
applying different apodization functions to the multichannel signal to generate respective signals;
estimating a signal predominant component and a noise predominant component based on the signals;
calculating a weight to be applied to the signal predominant component, using the signal predominant component and the noise predominant component; and
applying the weight to the signal predominant component to form a reception beam.

\* \* \* \* \*